(12) United States Patent
Nakashima et al.

(10) Patent No.: US 10,078,168 B2
(45) Date of Patent: Sep. 18, 2018

(54) VEHICLE LIGHTING UNIT

(71) Applicant: Stanley Electric Co., Ltd., Tokyo (JP)

(72) Inventors: Daisuke Nakashima, Tokyo (JP);
Norifumi Imazeki, Tokyo (JP);
Manabu Yatabe, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 153 days.

(21) Appl. No.: 14/919,955

(22) Filed: Oct. 22, 2015

(65) Prior Publication Data

US 2016/0116657 A1 Apr. 28, 2016

(30) Foreign Application Priority Data

Oct. 24, 2014 (JP) .................................. 2014-216976

(51) Int. Cl.
| | |
|---|---|
| *F21S 43/239* | (2018.01) |
| *F21V 8/00* | (2006.01) |
| *F21S 43/31* | (2018.01) |
| *F21S 43/40* | (2018.01) |
| *F21S 43/14* | (2018.01) |

(Continued)

(52) U.S. Cl.
CPC ............. *G02B 6/001* (2013.01); *F21S 43/239* (2018.01); *F21S 43/31* (2018.01); *F21S 43/40* (2018.01); *G02B 6/0035* (2013.01); *G02B 6/0073* (2013.01); *F21S 43/14* (2018.01); *F21S 43/237* (2018.01); *F21S 43/243* (2018.01); *F21S 43/245* (2018.01); *F21S 43/247* (2018.01)

(58) Field of Classification Search
CPC .... G02B 6/001; G02B 6/0035; G02B 6/0073;
F21S 48/2243; F21S 48/234; F21S 48/24
See application file for complete search history.

(56) References Cited

U.S. PATENT DOCUMENTS

| | | | |
|---|---|---|---|
| 2008/0232127 A1* | 9/2008 | Futami .................. | F21S 48/215 362/511 |
| 2013/0215633 A1* | 8/2013 | Wuerthele ............ | B60Q 1/0047 362/516 |

(Continued)

FOREIGN PATENT DOCUMENTS

| | | |
|---|---|---|
| DE | 199 31 008 C1 | 8/2000 |
| DE | 10 2011 085 226 A1 | 5/2013 |

(Continued)

OTHER PUBLICATIONS

Extended European Search Report for the related European Patent Application No. 15191094.0 dated Feb. 29, 2016.

(Continued)

*Primary Examiner* — Anabel Ton
(74) *Attorney, Agent, or Firm* — Kenealy Vaidya LLP

(57) ABSTRACT

A vehicle lighting unit can distribute light in a wider area than the conventional lighting unit without increasing the number of parts. The vehicle lighting unit can include: a light source; a light guiding member configured to have a side portion to receive light from the light source from the side portion and guide the light, and have an inclined face formed obliquely rearward in a light guiding path of the light; and a reflection face inclined forward and disposed to face to the inclined face with a gap between the reflection face and the inclined face of the light guiding member.

7 Claims, 4 Drawing Sheets

(51) Int. Cl.
*F21S 43/237* (2018.01)
*F21S 43/243* (2018.01)
*F21S 43/245* (2018.01)
*F21S 43/247* (2018.01)

(56) References Cited

U.S. PATENT DOCUMENTS

2013/0265802 A1* 10/2013 Kamikatano ........... G09F 13/18
  362/607
2014/0268872 A1* 9/2014 Holman ................. F21V 23/02
  362/608
2016/0297353 A1* 10/2016 Takahashi ............ B60Q 1/2669

FOREIGN PATENT DOCUMENTS

| EP | 1 443 265 A1 | 8/2004 |
| EP | 2 327 585 A1 | 6/2011 |
| EP | 2 442 013 A2 | 4/2012 |
| FR | 2 829 563 A1 | 3/2003 |
| JP | 2006-49232 A | 2/2006 |
| JP | 2008-098025 A | 4/2008 |
| JP | 2010-205418 A | 9/2010 |
| JP | 2011-138696 A | 7/2011 |
| JP | 2012-22909 A | 2/2012 |
| WO | 2004/052682 A1 | 6/2004 |

OTHER PUBLICATIONS

Japanese Office Action for the related Japanese Patent Application No. 2014-216976 dated Jun. 5, 2018.

* cited by examiner

VEHICLE LIGHTING UNIT

This application claims the priority benefit under 35 U.S.C. § 119 of Japanese Patent Application No. 2014-216976 filed on Oct. 24, 2014, which is hereby incorporated in its entirety by reference.

TECHNICAL FIELD

The presently disclosed subject matter relates to vehicle lighting units to be mounted in a vehicle body, and in particular, to a vehicle lighting unit configured to control light distribution by means of a light guiding member.

BACKGROUND ART

Some conventionally known vehicle lighting units to be mounted in a vehicle body can control light distribution by using a light guiding member.

This type of vehicle lighting unit, for example, described in Japanese Patent Application Laid-Open No. 2012-022909 can be configured to include an LED (light emitting diode) light source disposed in a lower portion thereof and emitting light upward, and a light guiding lens (light guiding member) having a shape inclined forward and obliquely upward with inclined faces. Here, the light guiding lens is configured to receive light emitted upward from the LED light source along the inclined shape and then totally reflect the light by the inclined faces forward.

In the vehicle lighting unit described in Japanese Patent Application Laid-Open No. 2012-22909, the light is distributed forward only by the total reflection with the light guiding lens. Thus, the direction of light distribution may be limited due to the relationship with the critical angle of the light incident on the total reflection surface or the inclined faces of the light guiding lens. For example, the vehicle lighting unit with this configuration cannot distribute light to a direction obliquely downward and forward.

As a result, if light is to be distributed in a wider area, it is necessary to dispose an additional light source disposed at a different position to cause the light to be incident on the light guiding lens from a different direction, resulting in increase of parts number.

SUMMARY

The presently disclosed subject matter was devised in view of these and other problems and features in association with the conventional art. According to an aspect of the presently disclosed subject matter, a vehicle lighting unit can distribute light in a wider area than the conventional lighting unit without increasing the number of parts.

According to another aspect of the presently disclosed subject matter, a vehicle lighting unit can include: a light source; a light guiding member configured to have a side portion to receive light from the light source from the side portion and guide the light, and have an inclined face formed obliquely rearward in a light guiding path of the light; and a reflection face inclined forward and disposed to face to the inclined face with a gap between the reflection face and the inclined face of the light guiding member.

According to still another aspect of the presently disclosed subject matter, the vehicle lighting unit according to the above aspect can be configured such that the light guiding member can have a front face and a rear face, and an optical cut is formed at a portion of the light guiding path from the side portion to the inclined face in any of the front face and the rear face.

According to still another aspect of the presently disclosed subject matter, the vehicle lighting unit according to any of the above aspects can be configured such that the light guiding member can have a hole portion of which inner face serves as the inclined face, and the vehicle lighting unit can further include a reflection block member that can have the reflection face and be fit to the hole portion with the gap between the inclined face of the light guiding member and the reflection face of the reflection block member.

With this configuration, when the light emitted from the light source enters the light guiding member from its side portion and part of the light is incident on the inclined face of the light guiding member at an incident angle equal to or larger than the critical angle, the light can be totally reflected by the inclined face forward. When another part of the light is incident on the inclined face at an incident angle smaller than the critical angle, the light is not totally reflected by the inclined face but can pass therethrough and then can impinge on and totally reflected by the reflection face. Thereafter the light can pass through the gap between the inclined face and the reflection face to be projected forward. The light distribution is achieved by the total reflection by the inclined face of the light guiding member. In addition to this, the total reflection by the reflection face can achieve the light distribution in a direction different from the direction in which the inclined face of the light guiding member directs the light.

Therefore, when compared with the light distribution control using only the total reflection of the light guiding lens, a wider light distribution can be achieved without increasing parts number (such as the provision of an additional light source).

BRIEF DESCRIPTION OF DRAWINGS

These and other characteristics, features, and advantages of the presently disclosed subject matter will become clear from the following description with reference to the accompanying drawings, wherein.

DESCRIPTION OF EXEMPLARY EMBODIMENTS

Figure 1:
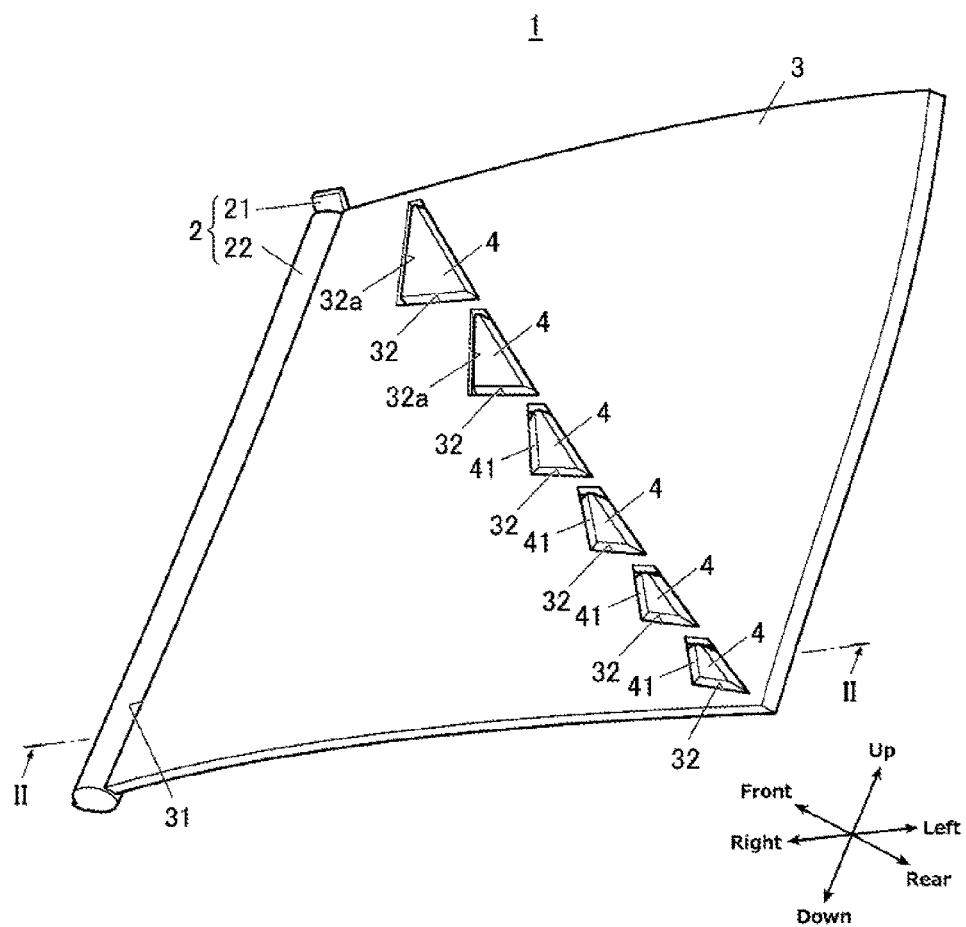
FIG. 1 is a perspective view illustrating essential parts of a vehicle lighting unit of one exemplary embodiment made in accordance with principles of the presently disclosed subject matter.

A description will now be made below to vehicle lights of the presently disclosed subject matter with reference to the accompanying drawings in accordance with exemplary embodiments. Note that the directions are defined on the basis of the posture in which light is emitted forward as illustrated in the drawings unless otherwise specified.

Figure 2:
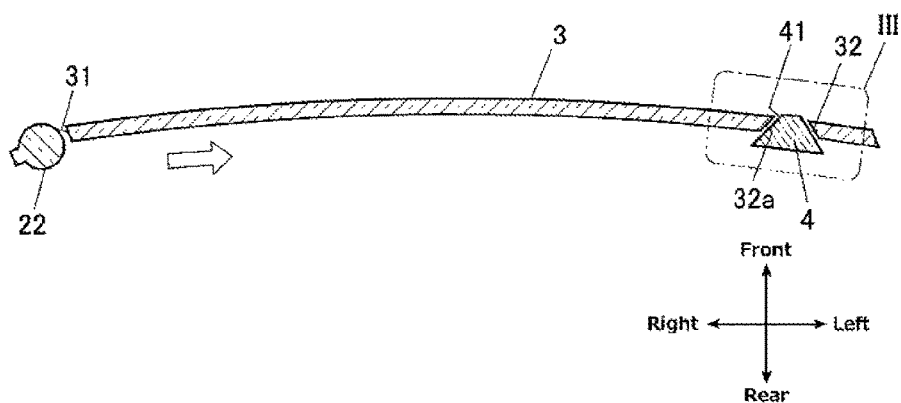
FIG. 2 is a cross-sectional view of FIG. 1 taken along line II-II in FIG. 1.
Figure 3:
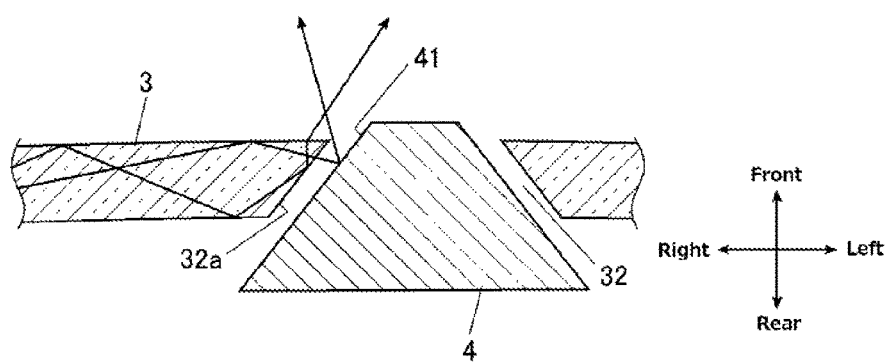
FIG. 3 is an enlarged view of part III in FIG. 2.

FIG. 1 is a perspective view illustrating essential parts of a vehicle lighting unit of an exemplary embodiment made in accordance with the principles of the presently disclosed subject matter. FIG. 2 is a cross-sectional view of FIG. 1 taken along line II-II in FIG. 1, and FIG. 3 is an enlarged view of part III in FIG. 2.

As illustrated in FIGS. 1 and 2, the vehicle lighting unit 1 can include a light source unit 2, a light guiding plate 3, a plurality of reflection blocks 4, etc.

The light source unit 2 can include an LED (light emitting diode) and a light guiding bar 22. In the light source unit 2, the light guiding bar 22 can have a plurality of lens cuts (not illustrated) arranged on the right side face in the up-down direction, and the LED 21 can be disposed to face the upper end face of the light guiding bar 22. In the light source unit 2 with this configuration, the LED 21 can emit light toward the light guiding bar 22 to enter the same. The light can be then guided within the light guiding bar 22 while being reflected by the plurality of lens cuts. Thus, the light can be projected leftward along the entire length of the light guiding bar 22.

The light guiding plate 3 can be formed to be gently curved while being convex forward. The light guiding plate 3 can have a substantially rectangular shape when viewed from front side and erect to be substantially orthogonal to a front-rear direction. The light guiding plate 3 can face to the light guiding bar 22 of the light source unit 2 at its right end face 31, so that the light exiting from the light guiding bar 22 can enter the light guiding plate 3 through the right end face 31.

Furthermore, the light guiding plate 3 can have a plurality of hole portions 32 of which shape is a substantially rectangular shape when viewed from its front side. The plurality of hole portions 32 can be arranged from the right upper portion of the light guiding plate 3 to the left lower portion as illustrated in FIG. 1. The size of the hole portions 32 can be varied to be made smaller toward the left lower portion. Furthermore, the size of the hole portions 32 in the thickness direction of the plate can be made wider toward the rear side of the light guiding plate 3. The thus configured hole portion 32 can have a right inner face 32a that is an inclined face that is formed to be inclined obliquely rearward with respect to the light guided from the right side of the light guiding plate 3.

The plurality of reflection blocks 4 can be formed to be a substantially truncated triangular pyramid shape with a different size corresponding to the respective hole portions 32 of the light guiding plate 3. The thus formed reflection blocks 4 can be fit to the corresponding hole portions 32 with a gap interposed therebetween. Each of the reflection blocks 4 can be provided with an aluminum coating on its surface by vapor deposition or the like, so that the surface can reflect light. Each of the reflection blocks 4 can have a right side face 41 that is closer to the light source unit 2 and can face to the right inner face 32a of the hole portion 32 of the light guiding plate 3 with a gap interposed therebetween. Thus, the right side face 41 can be a reflection surface inclined obliquely forward so as to correspond to the right inner face 32a of the light guiding plate 3.

In the vehicle lighting unit 1 with the above configuration, when the light emitted from the light source unit 2 is guided and projected by the light guiding bar 22 leftward, the light can be incident on the right end face 31 of the light guiding plate 3 to be guided therewithin leftward.

Then, as illustrated in FIG. 3, part of the light incident on the right inner face 32a of the hole portion 32 at an incident angle equal to or larger than the critical angle can be totally reflected by the right inner face 32a to exit through the front face of the light guiding plate 3 forward.

On the other hand, another part of the light incident on the right inner face 32a of the hole portion 32 at an incident angle smaller than the critical angle is not totally reflected by the right inner face 32a but can transmit the same and enter the space within the hole portion 32. Then, the light can impinge on and be totally reflected by the right side face 41 of the reflection block 4 disposed within the hole portion 32 and be irradiated forward through the gap between the right side face 41 of the reflection block 4 and the right inner face 32a of the hole portion 32.

In this manner, the light totally reflected by the right inner side 32a of the hole portion 32 of the light guiding plate 3 and the light totally reflected by the right side face 41 of the reflection block 4 can be directed (distributed) in respective different directions.

Accordingly, the vehicle lighting unit 1 of the present exemplary embodiment can be configured such that part of the light emitted from the light source unit 2 and entering the light guiding plate 3 through the right end face 31 can be incident on the right inner face 32a of the hole portion 32 at an incident angle equal to or larger than the critical angle. This light can be totally reflected by the right inner face 32a to exit through the front face of the light guiding plate 3 forward. On the other hand, another part of the light incident on the right inner face 32a of the hole portion 32 at an incident angle smaller than the critical angle is not totally reflected by the right inner face 32a but can transmit the same and enter the space within the hole portion 32 to impinge on the right side face 41 of the reflection block 4 disposed within the hole portion 32. Then, the light can be totally reflected by the right side face 41 of the reflection block 4 and be irradiated forward through the gap between the right inner face 32a of the hole portion 32 and the right side face 41 of the reflection block 4.

Therefore, a partial light distribution can be achieved by the total reflection by the right inner face 32a of the hole portion 32 (the inclined face of the light guiding member). In addition to this, the total reflection by the right side face 41 of the reflection block 4 (the reflection face) can achieve another partial light distribution in a direction different from the direction in which the right inner face 32a of the hole portion 32 directs the light.

Thus, when compared with the light distribution control using only the total reflection of the conventional light guiding lens, a wider light distribution can be achieved without increasing parts number (such as the provision of an additional light source). Because of no additional light source needed, the degree of freedom for the arrangement of the lighting unit can be enhanced.

Figure 4:
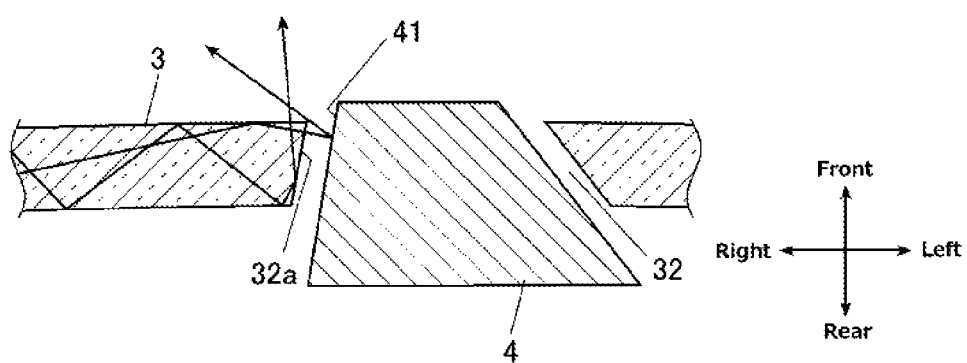
FIG. 4 is a cross-sectional view in part, illustrating a modified example of the vehicle lighting unit in accordance with the exemplary embodiment.

Furthermore, as illustrated in FIGS. 3 and 4, the adjustment of the inclined angles of the right inner face 32a of the hole portion 32 of the light guiding plate 3 and the right side face 41 of the reflection block 4 can appropriately control the light distribution directions by the total reflection at the right inner face 32a and the right side face 41.

The exemplary embodiment to which the presently disclosed subject matter can be applied is not limited to the above-described mode, but may appropriately be modified without departing from the gist of the presently disclosed subject matter.

Figure 5:
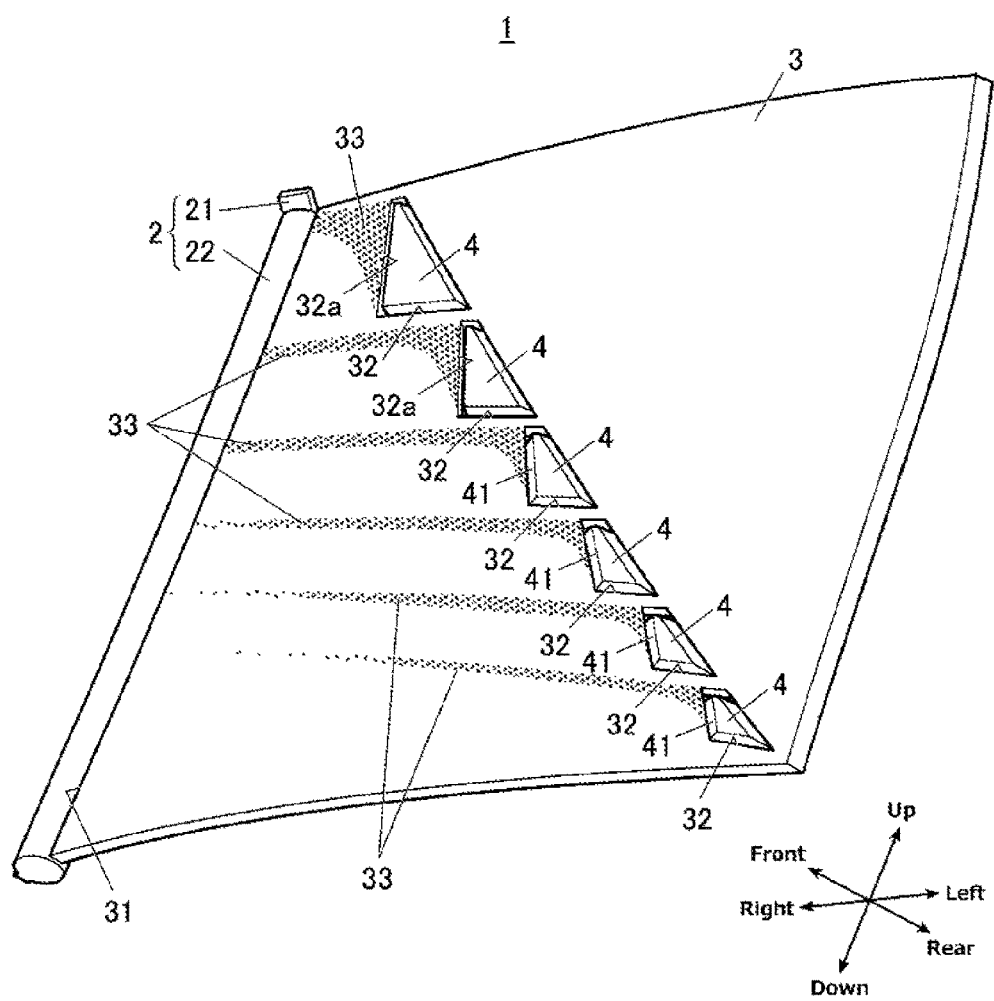
FIG. 5 is a perspective view illustrating another modified example of the vehicle lighting unit in accordance with the exemplary embodiment.

In the above-described exemplary embodiment, the light guiding plate 3 along the light guiding path from the incident face, or the right end face 31, to the right inner face 32a of the hole portion 32 can simply guide the light. However, as illustrated in FIG. 5, for example, the light guiding plate 3 along the light guiding path can include optical functional portions, such as a plurality of reflection dots 33 in the front or rear surface, so that that portion along the light guiding path can be illuminated with light. This configuration can achieve an elongated illuminated area, thereby increasing the design variations.

The reflection dots 33 can be configured as an optical cut that can reflect or refract the light guided by the light guiding plate 3 from the right end face 31 to the right inner face 32a. Another example may be a light-guiding cut instead of the reflection dot 33. Furthermore, the pitch or depth of such light guiding cuts or a height of projections can be free adjusted, for example, can be made smaller to prevent them from being visually recognized during not used (not lighting). This may enhance the transparency of the light guiding plate 3 when not in use.

In still another exemplary embodiment, the right side face 41 of the reflection block 4 can be configured as a reflection surface composed of a plurality of small reflection surfaces directed in mutually different directions, like a so-called multi-reflector, to thereby achieve a configuration by which a light distribution in plural directions can be achieved.

Furthermore, in the above-mentioned exemplary embodiment, the light guiding plate 3 can erect in a direction substantially orthogonal to the front-rear direction, and the light from the light source unit 2 can enter from the right side of the light guide plate 3 and travel leftward. The presently disclosed subject matter is not limited to this, and can be configured to appropriately arrange these components according to intended purposes.

Furthermore, the light guiding plate 3 can serve as the light guiding member receiving and guiding light from the light source 2 and totally reflecting the light. This configuration is not limitative, but the light guiding member can be another form, such as an elongated light guiding rod-shaped member.

The light source unit 2 is not limited to that comprising the LED 2 and the light guiding bar 22, but may be configured to cause light to enter the light guiding member. For example, the light source unit 2 can be configured only by an LED or LEDs directly facing to the light incident face of the light guiding member.

The shapes of hole portion 32 and the reflection block 4 are not limited to a triangle, but may be other polygonal shapes or circular shape as long as the advantageous effects of the presently disclosed subject matter can be achieved.

It will be apparent to those skilled in the art that various modifications and variations can be made in the presently disclosed subject matter without departing from the spirit or scope of the presently disclosed subject matter. Thus, it is intended that the presently disclosed subject matter cover the modifications and variations of the presently disclosed subject matter provided they come within the scope of the appended claims and their equivalents. All related art references described above are hereby incorporated in their entirety by reference.

What is claimed is:

1. A vehicle lighting unit comprising:
a light source;
a light guiding member configured to have a side portion to receive light from the light source from the side portion and guide the light, and have an inclined face formed obliquely rearward in a light guiding path of the light; and
a reflection block member having a reflection face inclined forward and disposed to face to the inclined face of the light guiding member with a gap between the reflection face and the inclined face, wherein the light guiding member has a front face and a rear face, and an optical cut is formed at a portion of the light guiding path from the side portion to the inclined face in any of the front face and the rear face.

2. A vehicle lighting unit comprising:
a light source;
a light guiding member configured to have a side portion to receive light from the light source from the side portion and guide the light, and have an inclined face formed obliquely rearward in a light guiding path of the light; and
a reflection face inclined forward and disposed to face to the inclined face with a gap between the reflection face and the inclined face of the light guiding member, wherein
the light guiding member has a hole portion of which inner face serves as the inclined face, and
the vehicle lighting unit further comprises a reflection block member that has the reflection face and is fit to the hole portion with the gap between the inclined face of the light guiding member and the reflection face of the reflection block member.

3. A vehicle lighting unit comprising:
a light source;
a light guiding member configured to have a side portion to receive light from the light source from the side portion and guide the light, and have an inclined face formed obliquely rearward in a light guiding path of the light; and
a reflection face inclined forward and disposed to face to the inclined face with a gap between the reflection face and the inclined face of the light guiding member, wherein
the light guiding member has a front face and a rear face, and an optical cut is formed at a portion of the light guiding path from the side portion to the inclined face in any of the front face and the rear face, wherein
the light guiding member has a hole portion of which inner face serves as the inclined face, and
the vehicle lighting unit further comprises a reflection block member that has the reflection face and is fit to the hole portion with the gap between the inclined face of the light guiding member and the reflection face of the reflection block member.

4. A vehicle lighting unit comprising:
a light source;
a light guiding member configured to have a side portion to receive light from the light source from the side portion and guide the light, and have an inclined face formed obliquely rearward in a light guiding path of the light; and
a reflection face inclined forward and disposed to face to the inclined face with a gap between the reflection face and the inclined face of the light guiding member, wherein
when the light emitted from the light source enters the light guiding member from the side portion and is incident on the inclined face of the light guiding member at an incident angle equal to or larger than the critical angle, the light is totally reflected by the inclined face forward, and
when the light is incident on the inclined face at an incident angle smaller than the critical angle, the light is not totally reflected by the inclined face but passes therethrough and enters the hole portion, and then impinges on and is totally reflected by the reflection face so that the light passes through the gap between the inclined face and the reflection face to be projected forward.

5. A vehicle lighting unit comprising:

a light source;

a light guiding member configured to have a side portion to receive light from the light source from the side portion and guide the light, and have an inclined face formed obliquely rearward in a light guiding path of the light; and a reflection face inclined forward and disposed to face to the inclined face with a gap between the reflection face and the inclined face of the light guiding member, wherein the light guiding member has a front face and a rear face, and an optical cut is formed at a portion of the light guiding path from the side portion to the inclined face in any of the front face and the rear face, wherein when the light emitted from the light source enters the light guiding member from the side portion and is incident on the inclined face of the light guiding member at an incident angle equal to or larger than the critical angle, the light is totally reflected by the inclined face forward, and when the light is incident on the inclined face at an incident angle smaller than the critical angle, the light is not totally reflected by the inclined face but passes therethrough and enters the hole portion, and then impinges on and is totally reflected by the reflection face so that the light passes through the gap between the inclined face and the reflection face to be projected forward.

6. The vehicle lighting unit according to claim 2, wherein when the light emitted from the light source enters the light guiding member from the side portion and is incident on the inclined face of the light guiding member at an incident angle equal to or larger than the critical angle, the light is totally reflected by the inclined face forward, and when the light is incident on the inclined face at an incident angle smaller than the critical angle, the light is not totally reflected by the inclined face but passes therethrough and enters the hole portion, and then impinges on and is totally reflected by the reelection face so that the light passes through the gap between the inclined face and the reflection face to be projected forward.

7. The vehicle lighting unit according to claim 3, wherein when the light emitted from the light source enters the light guiding member from the side portion and is incident on the inclined face of the light guiding member at an incident angle equal to or larger than the critical angle, the light is totally reflected by the inclined face forward, and when the light is incident on the inclined face at an incident angle smaller than the critical angle, the light is not totally reflected by the inclined face but passes therethrough and enters the hole portion, and then impinges on and is totally reflected by the reflection face so that the light passes through the gap between the inclined face and the reflection face to be projected forward.

* * * * *